(12) United States Patent
Patel et al.

(10) Patent No.: US 11,511,771 B2
(45) Date of Patent: Nov. 29, 2022

(54) ENHANCED NAVIGATION AND RIDE HAILING

(71) Applicants: AT&T Intellectual Property I, L.P., Atlanta, GA (US); AT&T Mobility II LLC, Atlanta, GA (US)

(72) Inventors: Bhumit Patel, Smyrna, GA (US); Iftekhar Alam, Roswell, GA (US); Wasib Khallil, Lilburn, GA (US); Jonathan Chang, Atlanta, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 205 days.

(21) Appl. No.: 16/792,520

(22) Filed: Feb. 17, 2020

(65) Prior Publication Data

US 2021/0253125 A1   Aug. 19, 2021

(51) Int. Cl.
*B60W 60/00* (2020.01)
*G08G 1/0967* (2006.01)
*G01C 21/34* (2006.01)
*G05D 1/02* (2020.01)

(52) U.S. Cl.
CPC ..... *B60W 60/0011* (2020.02); *G01C 21/3415* (2013.01); *G01C 21/3461* (2013.01); *G05D 1/0212* (2013.01); *G08G 1/096725* (2013.01); *B60W 2552/05* (2020.02); *G05D 2201/0213* (2013.01)

(58) Field of Classification Search
CPC ........... B60W 60/0011; G01C 21/3415; G01C 21/3461; G05D 1/0212; G08G 1/096725
See application file for complete search history.

(56) References Cited

U.S. PATENT DOCUMENTS

| | | | | |
|---|---|---|---|---|
| 8,868,339 | B2* | 10/2014 | Wu | G01C 21/3461 701/465 |
| 10,907,983 | B1* | 2/2021 | Singh | G08G 1/09685 |
| 11,029,170 | B1* | 6/2021 | Sachdev | G01C 21/3682 |
| 11,054,270 | B1* | 7/2021 | Singh | G08G 1/096888 |
| 11,087,393 | B2* | 8/2021 | Sailer | G06Q 20/29 |
| 11,107,352 | B2* | 8/2021 | Ramot | G06Q 10/02 |
| 2006/0059023 | A1* | 3/2006 | Mashinsky | G06Q 10/02 705/5 |
| 2009/0295599 | A1* | 12/2009 | Coffee | G07B 15/063 340/928 |
| 2013/0261960 | A1* | 10/2013 | Wu | G01C 21/3461 701/538 |
| 2014/0278086 | A1* | 9/2014 | San Filippo | G01C 21/3423 701/527 |

(Continued)

FOREIGN PATENT DOCUMENTS

| | | | | |
|---|---|---|---|---|
| WO | WO-2019023324 A1 * | 1/2019 | | B60N 2/002 |
| WO | WO-2020131550 A1 * | 6/2020 | | G06Q 10/047 |

*Primary Examiner* — Luis A Martinez Borrero
(74) *Attorney, Agent, or Firm* — Guntin & Gust, PLC; Jay Anderson

(57) ABSTRACT

A system for navigation and ride hailing that provides options for navigating traffic through express lanes or the like. Information, such as express lane profile information, toll price information for the express lane during a period, and traffic information along one or more paths may be used to determine the fastest options along to a destination at different toll price points.

20 Claims, 8 Drawing Sheets

(56) References Cited

U.S. PATENT DOCUMENTS

| | | | |
|---|---|---|---|
| 2015/0095122 A1* | 4/2015 | Eramian | G06Q 10/10 |
| | | | 705/13 |
| 2015/0095197 A1* | 4/2015 | Eramian | G06Q 50/30 |
| | | | 705/26.64 |
| 2015/0095198 A1* | 4/2015 | Eramian | G06Q 30/0629 |
| | | | 705/26.64 |
| 2016/0003637 A1* | 1/2016 | Andersen | H04L 12/1827 |
| | | | 701/519 |
| 2016/0334235 A1* | 11/2016 | Gustafson | G01C 21/3492 |
| 2017/0169366 A1* | 6/2017 | Klein | G06Q 10/047 |
| 2017/0308090 A1* | 10/2017 | Asakura | B60W 10/20 |
| 2017/0313313 A1* | 11/2017 | Asakura | B60W 30/18009 |
| 2017/0365030 A1* | 12/2017 | Shoham | G08G 1/202 |
| 2020/0160476 A1* | 5/2020 | Ramot | G06Q 10/06315 |
| 2020/0160477 A1* | 5/2020 | Ramot | G01C 21/3438 |
| 2020/0160478 A1* | 5/2020 | Ramot | G01C 21/343 |
| 2020/0160709 A1* | 5/2020 | Ramot | B60W 60/00253 |
| 2020/0225049 A1* | 7/2020 | Balva | G01C 21/3438 |
| 2020/0286199 A1* | 9/2020 | Maddipati | G01C 21/3438 |
| 2021/0025721 A1* | 1/2021 | Kline | G01C 21/3423 |
| 2021/0065074 A1* | 3/2021 | Torrealba Fuenzalida | |
| | | | G08G 1/0125 |

* cited by examiner

ENHANCED NAVIGATION AND RIDE HAILING

BACKGROUND

One of the most popular features of modern mobile devices is the navigation application. People often use navigation applications on mobile devices to determine the best route to a destination even if they know how to get to their destination. The typical navigation application can provide route information, traffic information, and even information about businesses, such as restaurants, grocery stores, department stores, and the like. Navigation applications may be used in the context of ride hailing services. Ride hailing services may use online-enabled platforms to connect passengers and local drivers using private vehicles.

Even with such navigation applications and ride hailing services, whether it is a public bus system or private car, getting from one place to another seems increasingly more difficult and costly.

This background information is provided to reveal information believed by the applicant to be of possible relevance. No admission is necessarily intended, nor should be construed, that any of the preceding information constitutes prior art.

SUMMARY

Disclosed herein is a system for navigation and ride hailing that provides options for navigating traffic through express lanes or the like. In an example, an apparatus may include a processor and a memory coupled with the processor that effectuates operations. The operations may include receiving traffic information, wherein the traffic information comprises traffic conditions along one or more routes to a destination; receiving express lane pass information associated with a profile; receiving toll information along the one or more routes to the destination; based on the traffic information, express lane pass information, or toll information, determining a plurality of routes to the destination and corresponding costs for using each route of the plurality of routes to the destination; and transmitting the plurality of routes and corresponding costs for using each route of the plurality of routes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Disclosed herein is a system for navigation and ride hailing that provides options for skipping traffic through express lanes or the like. Information, such as express lane profile information, toll price information for the express lane during a period, and traffic information along one or more paths may be used to determine the fastest options along to a destination at different toll price points. The enhanced navigation and ride hailing system may be used to make and provide near real time calculations and identify fast and cost-efficient express lane routes.

Figure 1:
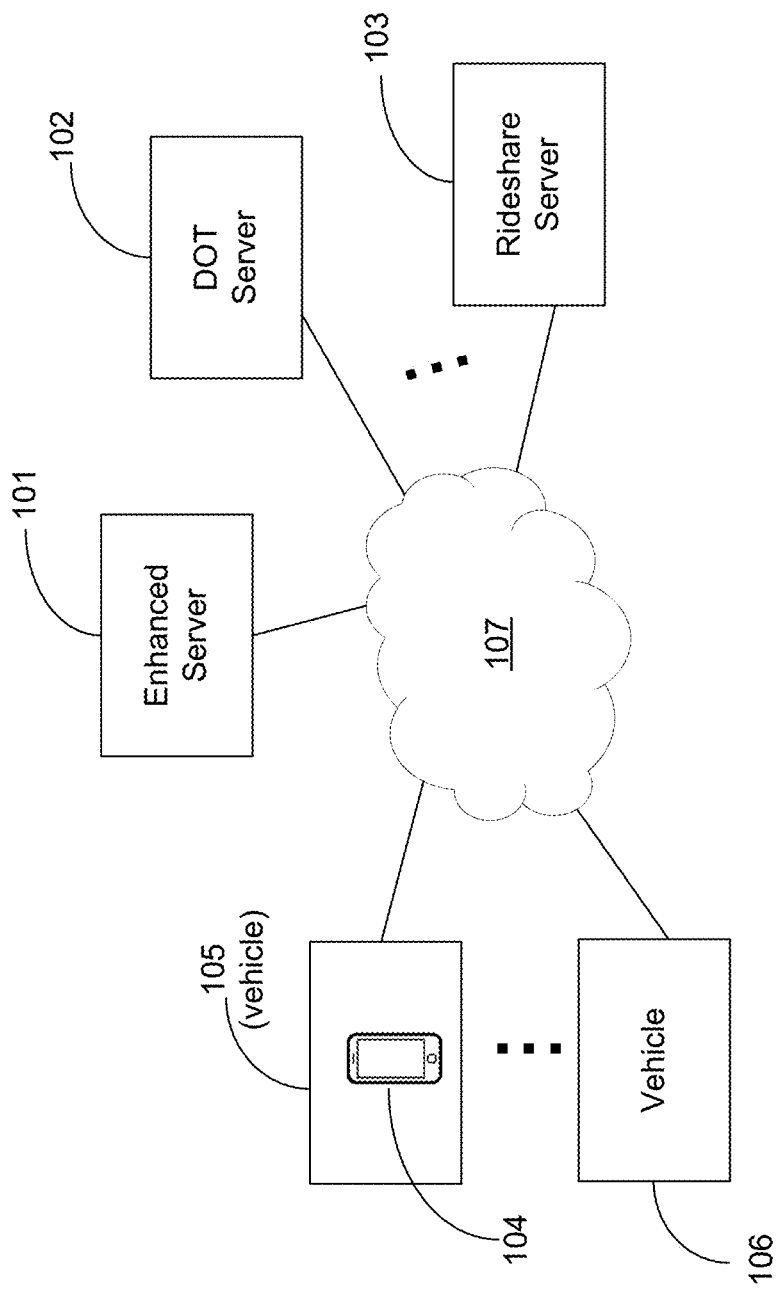
FIG. 1 illustrates an exemplary system for enhanced navigation and ride hailing.

FIG. 1 illustrates an exemplary system for enhanced navigation and ride hailing. System 100 may include server 101, server 102 (e.g., department of transportation server), server 103 (e.g., ride sharing or ride hailing server), mobile devices, such as mobile phone 104, vehicle 105, or vehicle 106. Mobile phone 104, vehicle 105, vehicle 106, server 101, server 102, and server 103 may be communicatively connected with each other via network 107. A mobile device may include a laptop, tablet, autonomous vehicle, or mobile phone, among other things. Vehicle 105 or vehicle 106 may be autonomous vehicles, which may range from level 2 (i.e., partial automation) to level 5 (i.e., full automation) as described by SAE international (formerly Society of Automotive Engineers). Server 102 may be a server that includes information associated with government roads or public transportation. In an example, the information of server 102 may include costs of tolls at a certain time, whether construction is occurring along a road, electronic pass holder profile information (e.g., account balance), planned construction dates for an area, weather, or hazardous conditions in an area, among other things. Server 103 may include ride sharing or ride hailing information, such as driver information, prices of a path to be navigated by a driver, driver history, history traversing a path for passengers, or demand for ride hailing or ride sharing for certain times, among other things. Server 101 may obtain information from multiple sources to assist in delivering enhanced navigation and ride hailing. The information of server 101 may include information from server 102, server 103, mobile phone 104, vehicle 105, vehicle 106, or the like.

Figure 2:
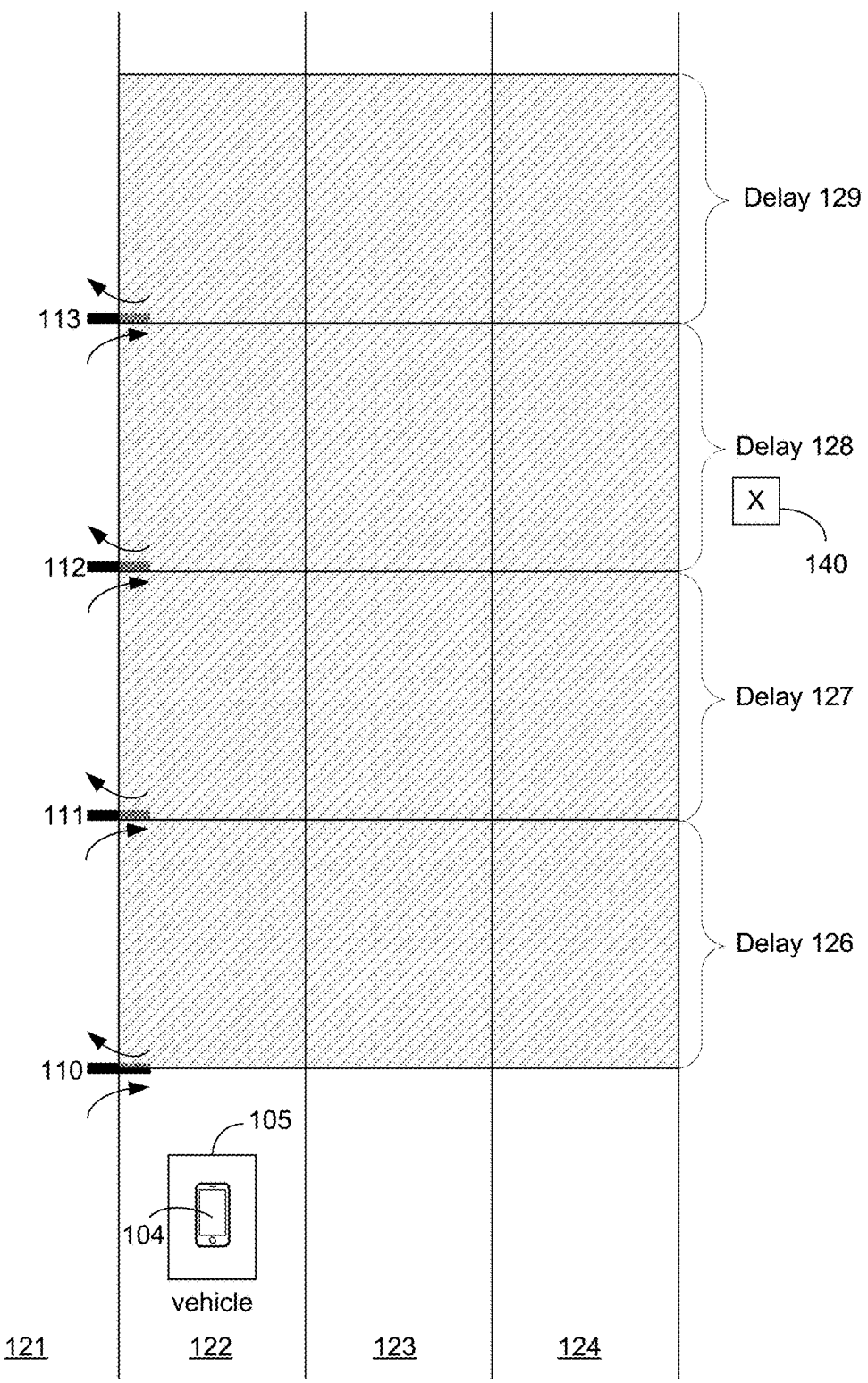
FIG. 2 illustrates an exemplary environment in which the enhanced navigation and ride hailing system may be implemented.

FIG. 2 illustrates an exemplary environment in which the enhanced navigation and ride hailing system may be implemented. As shown, there are a total of four lanes, which include 3 normal lanes (e.g., normal lane 122, normal lane 123, and normal lane 124) and one express lane (e.g., express lane 121). Express lanes may be considered specially-designated highway lanes that allow drivers to choose to pay a toll to use the lanes and that are often free (or at a reduced price) to carpools, motorcycles, vanpools and other eligible vehicles during the designated hours of operation. It is contemplated herein, that express lanes may always require a fee, regardless of how many passengers or the like. In addition, express lanes are usually on the same or very close to a highway with normal lanes (e.g., no fee) and are not extensively separated roads from the normal highway lanes (e.g., thousands of feet). Express lane 121, as shown, includes multiple exits, such as exit 110, exit 111, exit 112, and exit 113. Exit 110, exit 111, exit 112, and exit 113 may be configured to bi-directionally allow vehicle traffic to enter or exit. In addition, FIG. 2 illustrates exemplary delays (e.g., delay 126-delay 129) that may occur between each exit because of traffic due to car accidents or the like. The delays may be for different reasons and may add different time periods to travel along the normal route. Delay 126 may be due to a traffic accident, delay 127 may be due to the mere number of vehicles on the road, delay 128 may be due to bad weather, and delay 129 may be due to reduced lanes because of road work. Other exemplary reasons for delay may include stalled cars, overturned vehicles, or onlooker delay, among other things.

Figure 3:
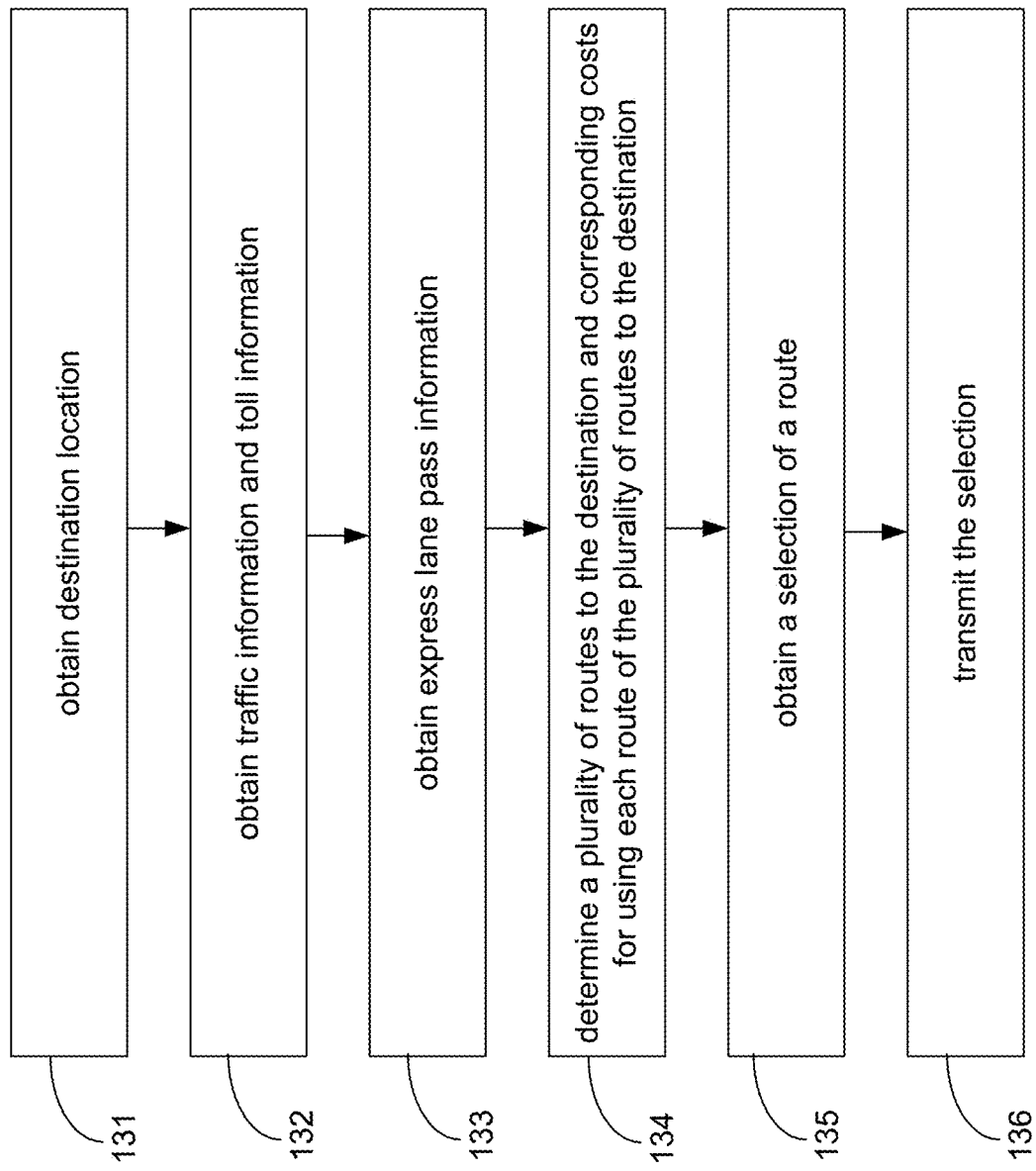
FIG. 3 illustrates an exemplary method for an enhanced navigation and ride hailing system.

FIG. 3 illustrates an exemplary method for an enhanced navigation and ride hailing system. In an exemplary scenario, at step 131, a navigation application may obtain destination location (e.g., an address or coordinate), such as destination location 140. The navigation application may operate on mobile phone 104 or vehicle 105 and be associated with a user profile.

At step 132, based on a current location of mobile phone 104 or vehicle 105, or destination location 140, traffic information and toll information may be obtained by server 101 of FIG. 1. Traffic information may include live traffic data, historical traffic data, or predicted traffic data. Live (e.g., near real-time) traffic data may include crowd source data, such as an indication (e.g., from other devices or user profiles) that there is an accident or another reason for delay, as discussed herein. Live traffic data may include speed of mobile devices in a location, weather information, locations of delay along a route, amount of delay along a route, or a confidence level associated with the device (e.g., mobile phone or camera) or user profile that is associated with the live traffic data, among other things. A confidence level may be used to increase or decrease the weighted use of traffic information which may account for reliability (e.g., level of trust) of information from a device or user profile. Confidence level may be based on a location of a device or user profile (e.g., reporting traffic information at significant distance from alleged traffic incident may reduce confidence level), number of confirmation of observances by other devices or user profiles, or the like. Historical traffic data may comprise similar categories of live traffic data, but over days, weeks, months, or the like. Predicted traffic data may use a combination of live traffic data and historical traffic data in order to determine an expected state (e.g., travel time) along a route to the destination location 140. Toll information may include a near real-time price to travel in an express lane during a period. The price may be affected by the length of the vehicle, the weight of the vehicle, the demand of the express lane, the time, or the like. For example, exit 110-exit 111 may be a first cost (also referred to as a toll or financial price), exit 111-exit 112 may be a second cost, and exit 110-exit 113 may be a third cost.

At step 133, based on the associated user profile of step 131, express lane pass information may be obtained by server 101. The express lane pass information associated with the user profile may be obtained from server 102 or another device. The express lane pass information may, for the designated user profile, indicate how much money is available on the express lane pass, whether mobile phone 104 or vehicle 105 is allowed to use an express lane, or user predetermined preferred cost restrictions under an absolute limit based on total balance available. A user profile may restrict the daily, monthly, or weekly amount that is allowed to be used. So, a user with a $100.00 available balance may have a daily restriction of $5.00 and the system for enhanced navigation and ride hailing will determine routes (also referred herein as paths) based on the daily restriction.

Figure 4:
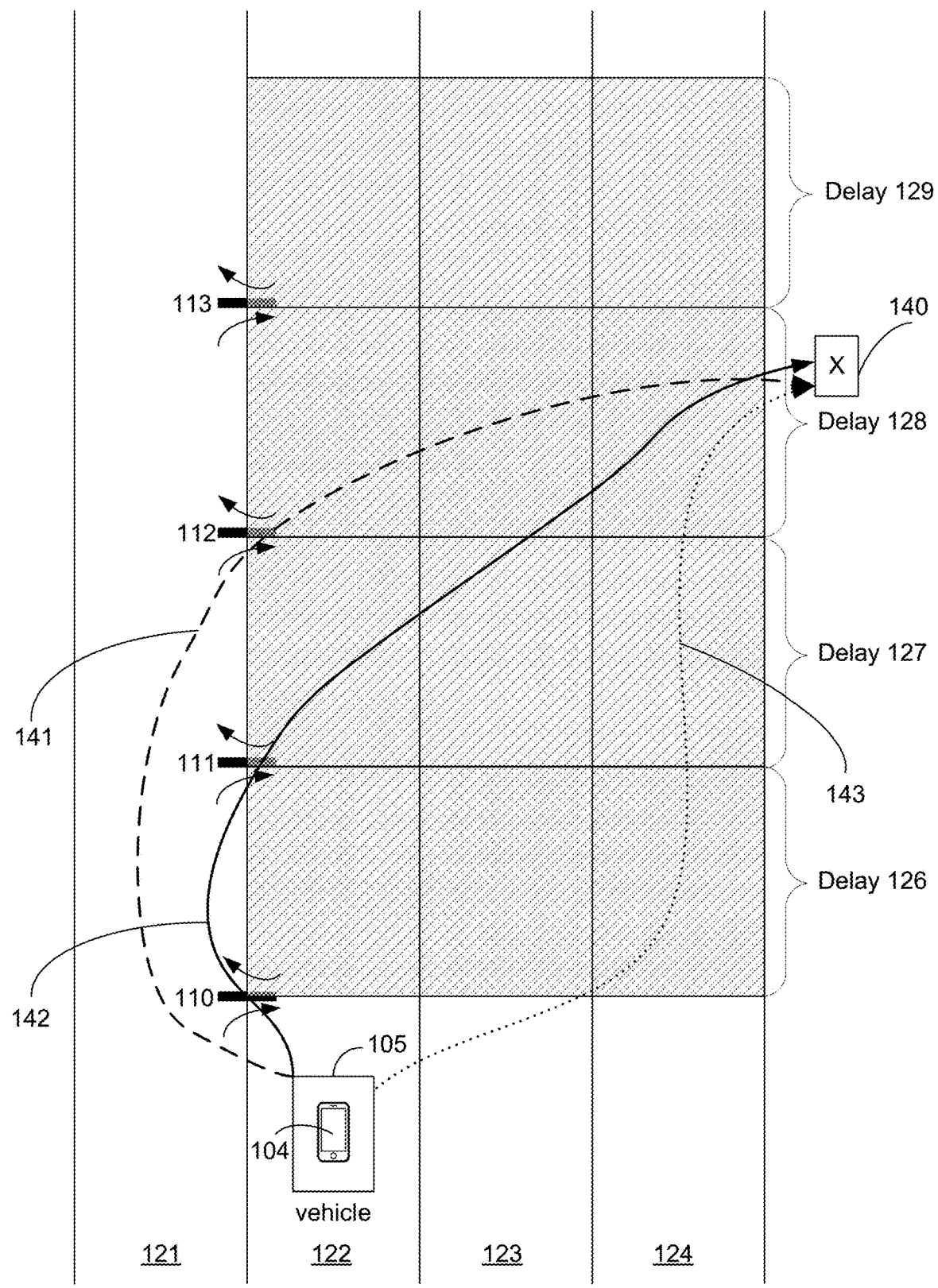
FIG. 4 illustrates exemplary routes to destination location.

With continued reference to FIG. 3, at step 134, based on the traffic information, express lane pass information, or toll information, determining a plurality of routes to the destination location 140 and corresponding costs for using each route of the plurality of routes to the destination location 140. FIG. 4 illustrates exemplary routes to destination location 140. The routes may include route 141, route 142, or route 143. Route 141 may be instructions to enter express lane 121 at exit 110 and leave express lane 121 at exit 112 to arrive at destination location 140 within a first estimated time at a first estimated cost. Route 143 bypasses delay 126 and delay 127 and traverses a portion of delay 128. Route 142 may be instructions to enter express lane 121 at exit 110 and leave express lane 121 at exit 111 to arrive at destination location 140 within a second estimated time at a second estimated cost. Route 142 bypasses delay 126 and traverses delay 127 and a portion of delay 128. Route 143 may be instructions to not enter express lane 121 and traverse delay 126, delay 127, and a portion of delay 128 to arrive at destination location 140 within a third estimated time at a third estimated cost.

At step 135, obtaining a selection of a first route of the plurality of routes of step 134. For example, route 142 may be selected. The selection may be based on touch input from a user interface or the like. Alternatively, the route may be selected based on additional criteria, such as predetermined preference in a user profile to select the fastest route (within a cost budget) to the destination, user history of selecting the first route over other routes when the route is within the top routes (e.g., top three ordered in amount of time or toll amount to traverse the routes), or the like. At step 136, transmitting an indication of the route selection to an interface of the driver of vehicle 105 (which may be autonomous).

Figure 5:
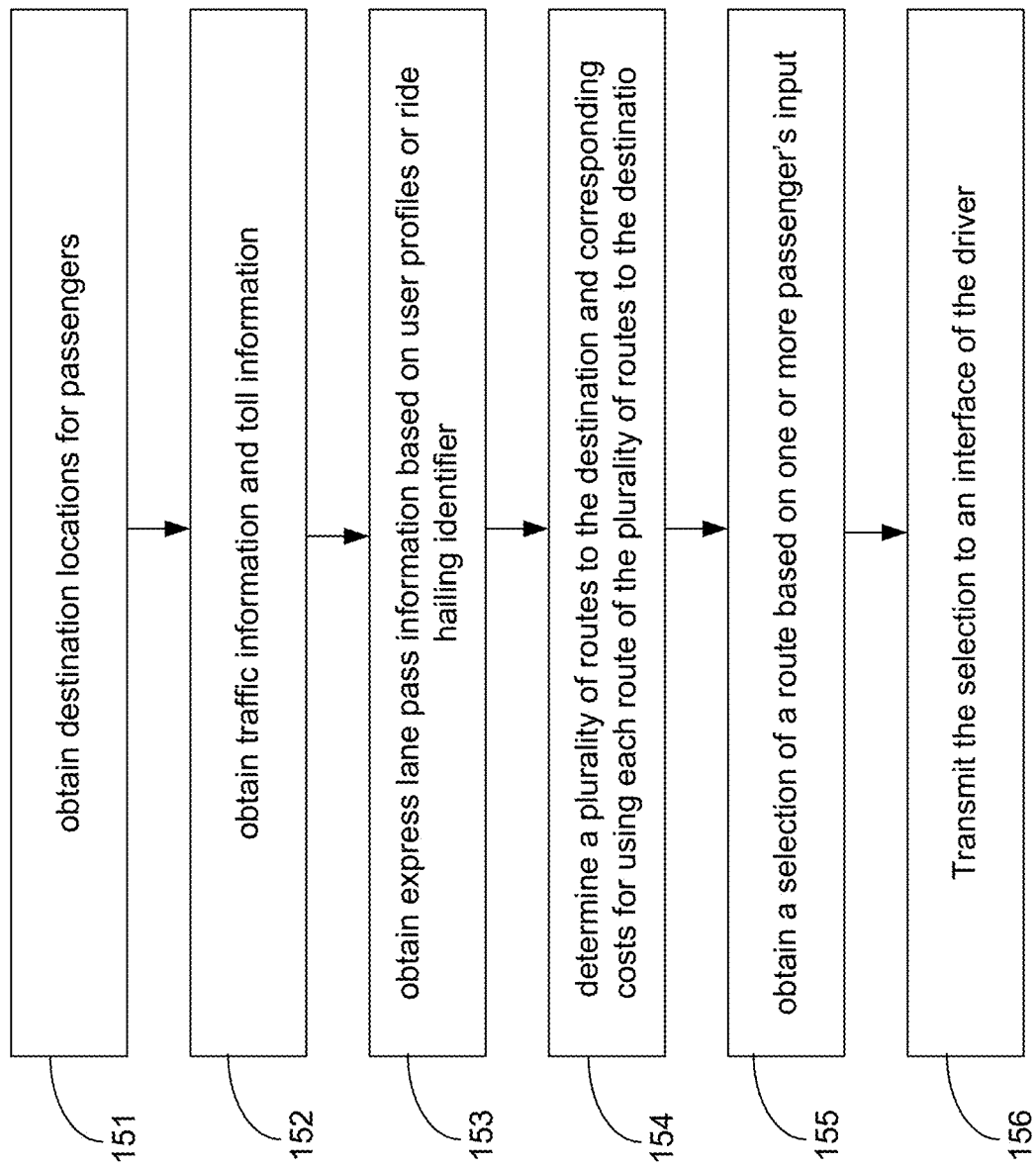
FIG. 5 illustrates an exemplary method for an enhanced navigation and ride hailing system.

FIG. 5 illustrates an exemplary method for an enhanced navigation and ride hailing system. In an exemplary scenario, at step 151, a navigation application may obtain destination location (e.g., an address or coordinate), such as destination location 140. The navigation application may operate on mobile phone 104 or vehicle 105 and be associated with a user profile of a ride sharing passenger or ride hauling passenger. A plurality of ride sharing passengers or ride hauling passengers in vehicle 105 are contemplated herein. Each passenger device (or user profile) during the time of the route may be linked to a single ride sharing identifier or ride hailing identifier. This linking may assist with subsequent route decisions during the time each passenger is in vehicle 105.

At step 152, based on a current location of mobile phone 104 or vehicle 105, or destination location 140, traffic information and toll information may be obtained by server 101 of FIG. 1. Traffic information may include live traffic data, historical traffic data, or predicted traffic data, as disclosed herein. Toll information may include cost to travel in an express lane during a period, as discussed herein. In some scenarios a ride sharing or ride hauling service may automatically receive free access to the express lane because there are multiple individuals in vehicle 105. There may be situations where a toll is required.

At step 153, based on the associated user profiles or ride sharing identifier (or ride hailing identifier) of step 151, express lane pass information may be obtained by server 101. The express lane pass information associated with the user profiles or ride sharing identifier may be obtained from server 102 or another device. In a first scenario, the user profile of a passenger may be linked to the ride hailing identifier and the express lane pass information may also be linked. In this instance, the ride hailer owner (e.g., taxi owner) may not need to purchase an express lane pass, for example. In a second scenario, the ride hailer owner may own an express lane pass and its express lane pass information may be obtained and used.

With continued reference to FIG. 5, at step 154, based on the traffic information, express lane pass information, or toll information, determining a plurality of routes to the destination location 140 and corresponding costs for using each route of the plurality of routes to the destination location 140. FIG. 4 illustrates exemplary routes to a destination location.

At step 155, obtaining a selection of a first route of the plurality of routes of step 134. For example, there may be two passengers headed to different destinations. A first passenger may be headed to destination location 140 and the second passenger may be headed to another destination location (not shown). In a first scenario, both passengers may receive an alert about the plurality of routes, and they may both decide to pay an additional cost (because of the toll) of the ride hailing service. The additional cost may be divided by the number of passengers or weighted (e.g., first passenger 70% of additional cost paid) by the passenger that receives the higher time savings benefit if a normal route (e.g., no toll route) was taken (e.g., first passenger receives 5 minutes and second passenger receives 2 minutes of savings). In a second scenario, both passengers may receive an alert about the plurality of routes, and only the passenger with the first stop may decide to pay an additional cost of the ride hailing service.

With continued reference to FIG. 5 and step 155, route 142 of FIG. 4 may be selected. The selection may be based on touch input from a user interface or the like. Alternatively, the route may be automatically selected based on additional criteria, such as predetermined preference in the user profiles to select the fastest route (within a price budget) to destination location 140, user history of selecting the first route over other routes when the route is within the top routes, predetermined preference in the user profiles to divide tolls in a certain manner, or the like. This predetermined preference to divide tolls (or other user profile preferences disclosed herein) may be an initial factor in whether a first user is picked to share the ride hailing service with a second user to the destination location 140 of the first user. At step 156, transmitting an indication of the route selection to an interface of the driver of vehicle 105 (which may be autonomous).

It is contemplated herein that the discussion and example scenarios of ride hailing and ride sharing as discussed herein apply generally equally to each other. One term or the other will be used for simplicity but is considered generally similar in application. It is also contemplated herein that the navigation may be updated after a selection or initial determination. For example, route 142 may be initially selected but as vehicle 105 approaches exit 111 route 141 may be selected. In addition, it is contemplated herein that the express lane pass information, toll information, and traffic information, among other information (e.g., number of passengers) may be on one device or distributed over multiple devices.

Figure 6:
FIG. 6 illustrates an exemplary alert for the system for enhanced navigation and ride hailing.

Disclosed below is additional subject matter for the enhanced navigation and ride hailing system. The enhanced navigation and ride hailing system may make near real time calculations and identify faster express lane routes (when available) at different price points. For navigation and ride share apps, pop up alerts (see FIG. 6) may inform riders when faster express lane routes are available along with how much time may be saved and at what cost. If the rider chooses an express lane option, the additional cost may be added to the initial cost of the ride. This feature enhancement may be applicable to other navigation apps. The enhanced navigation and ride hailing system may provide users more options on how and when to use express lanes efficiently and allow price conscious users to pick the option that best fits their needs.

Conventional ride hailing, ride sharing, and navigation applications may not give users the option to use express lanes to expedite their travel. The disclosed feature enhancement takes into account toll prices and traffic conditions to suggest faster options along with the route with time savings at different price points. Traffic conditions may include live traffic determination (e.g., current time to arrive at destination along one or more routes based on number of vehicles on road, weather conditions, accidents or the like).

Further, the disclosed feature enhancement may provide options to the users and navigate them through the exact entry and exits points of the express lane based on the selected option. The disclosed system allows for options to avoid congestion (construction, accident, rush-hour) using express lanes. The disclosed system is made aware of the entry and exit points of the express lanes, and when a vehicle should move to the normal lanes after they skip the congested area and vice versa.

Figure 7:
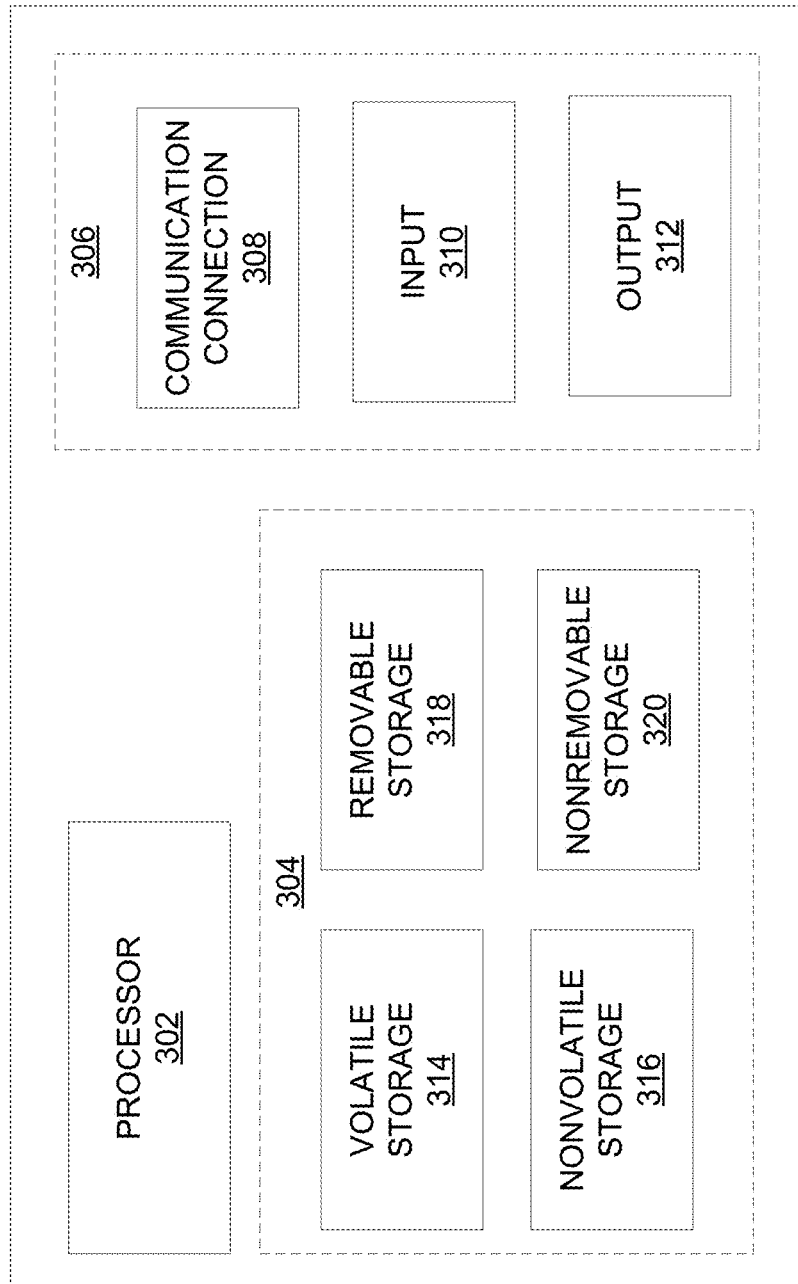
FIG. 7 illustrates a schematic of an exemplary network device.

FIG. 7 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 7 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 7 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 7) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 8:
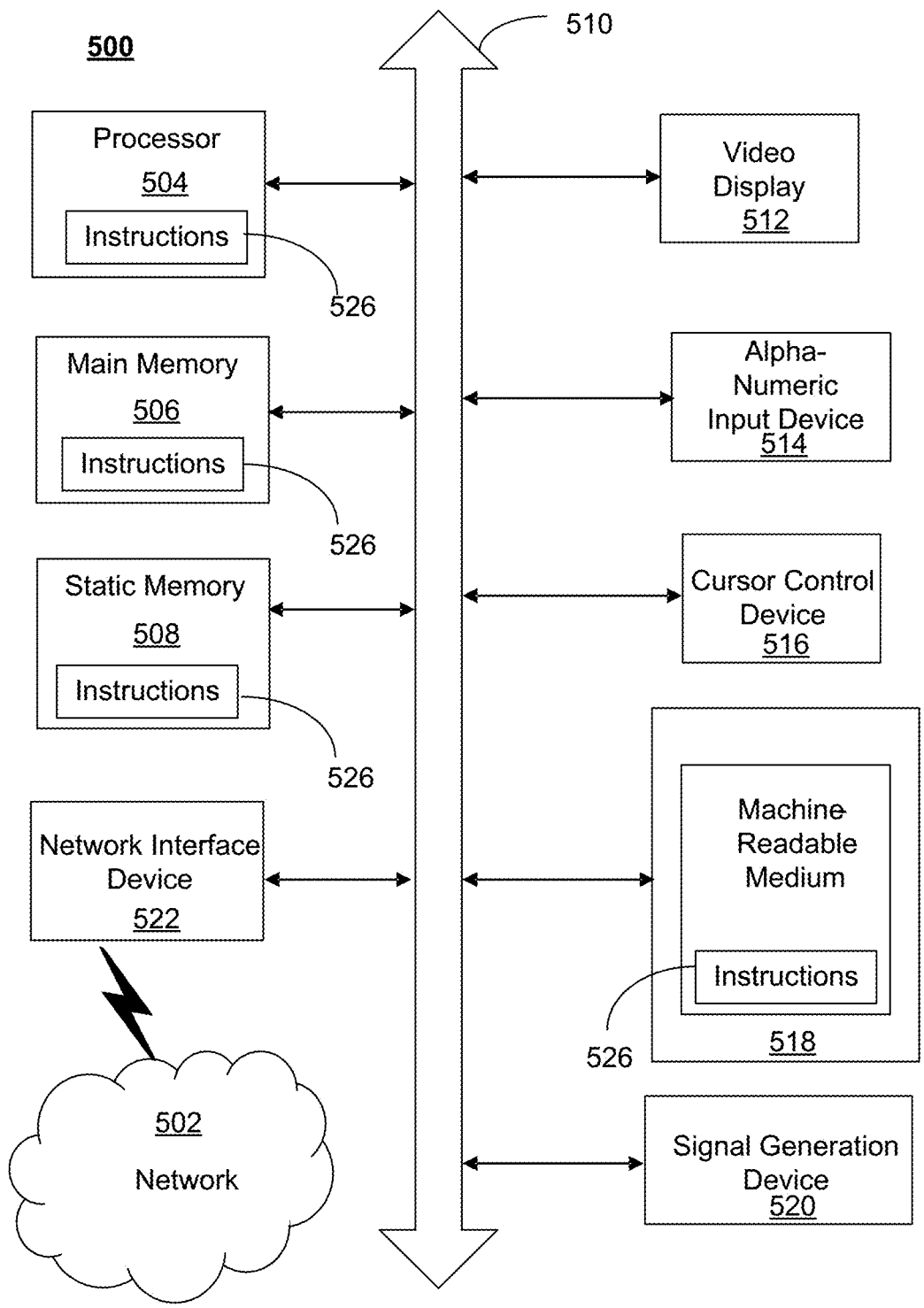
FIG. 8 illustrates an exemplary communication system that provides wireless telecommunication services over wireless communication networks.

FIG. 8 depicts an exemplary diagrammatic representation of a machine in the form of a computer system 500 within which a set of instructions, when executed, may cause the machine to perform any one or more of the methods described above. One or more instances of the machine can operate, for example, as processor 302, vehicle 105, vehicle 106, mobile device 105, server 103, server 101, server 102, or other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which navigation and ride hailing alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—enhanced navigation and ride hailing—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for managing or operating an enhanced navigation or ride hailing system. A method, system, computer readable storage medium, or apparatus may obtain (e.g., receive) traffic information, wherein the traffic information includes traffic conditions along one or more paths (also referred herein as a route) to a destination; obtain express lane pass information associated with a profile (e.g., user profile of a passenger or mobile phone user); obtain toll information along the one or more paths to the destination; based on the traffic information, express lane pass information, or toll information, determine a plurality of paths to the destination and corresponding costs for using each path of the plurality of paths to the destination; and transmit the plurality of paths and corresponding costs for using each path of the plurality of paths to the destination. The plurality of paths (i.e., routes) may be routes from a current location (or other marked beginning location) of a mobile device and a destination location (e.g., a restaurant, home, office, field, or the like). The method, system, computer readable storage medium, or apparatus provides for obtaining a selection (e.g., an indication of a selection) of a first path of the plurality paths; and based on the selection of the first path, sending a message to a rideshare device or autonomous vehicle to alter a navigation path of a vehicle to the first path. The method, system, computer readable storage medium, or apparatus provides for based on the plurality of paths and corresponding costs for using each path, determining a first path that corresponds to a cost threshold and time threshold; and transmitting instructions that indicate to a navigation application to travel along the first path. The navigation application may be associated with an autonomous vehicle. The method, system, computer readable storage medium, or apparatus provides for based on the traffic information, express lane pass information, or toll information, determining a first path of the one or more paths to the destination. The method, system, computer readable storage medium, or apparatus provides for obtaining a selection of a first route of the plurality of routes; and based on the selection of the first route, sending a message to a navigation application to alter a navigation route of a vehicle to the first route. The first route may be displayed on an interface of a mobile device. The method, system, computer readable storage medium, or apparatus provides for automatically obtaining a selection of a first route of the plurality of routes based on the profile. The profile may include a daily amount that may be used for express lanes, how a toll is divided between passengers of a vehicle, time of day, or the like. Methods, systems, and apparatuses, among other things, as described herein may provide for managing or operating an enhanced navigation or ride hailing system by sending a destination location; responsive to sending the destination location, obtaining a plurality of routes to the destination location and corresponding costs for using each route of the plurality of routes to the destination location, wherein the plurality of routes comprises express lanes; and displaying the plurality of routes and corresponding costs (e.g., financial costs of number of dollars and cents) for using each route of the plurality of routes. A user may enter a destination location into a mobile device interface via text or voice and the destination may be determined locally on the mobile device or on a remote server. The method, system, computer readable storage medium, or apparatus provides for automatically displaying a first route of the plurality of routes based on the profile or automatically sending a selection of a first route of the plurality of routes based on the profile, wherein the profile comprises a daily amount that may be used for express lanes. The method, system, computer readable storage medium, or apparatus provides for based on the plurality of routes and corresponding costs for using each route, determining a first route that corresponds to a cost threshold and time threshold; and displaying the first route. All combinations in this paragraph (including the removal or addition of steps) are contemplated in a manner that is consistent with the other portions of the detailed description.

What is claimed:

1. A method comprising:
   receiving, by a processing system including a processor, ride sharing requests from equipment of a plurality of prospective passengers;
   obtaining, by the processing system, a profile for each of the plurality of prospective passengers, the profile including a predetermined preference regarding sharing costs associated with a shared ride;
   accepting, by the processing system, ride sharing requests from a set of the equipment of the plurality of prospective passengers, resulting in a shared ride with a plurality of passengers traveling in a vehicle, the accepting based on the predetermined preference of each of the plurality of passengers;
   receiving, by the processing system, traffic information, wherein the traffic information comprises traffic conditions along one or more routes to a plurality of destinations;
   receiving, by the processing system, express lane pass information associated with a profile for each of the plurality of passengers, each of the plurality of passengers having a destination of the plurality of destinations;
   receiving, by the processing system, toll information along the one or more routes;
   based on the traffic information, express lane pass information, and toll information, determining, by the processing system, a plurality of routes and corresponding costs for using each route of the plurality of routes;
   transmitting, by the processing system according to the profile, the plurality of routes and corresponding costs for using each route of the plurality of routes;
   receiving, by the processing system, a selection of a route of the plurality of routes;
   transmitting, by the processing system, an indication of the selection to an interface of a driver of the vehicle;
   determining, by the processing system, an additional cost and a time savings benefit associated with the selected route; and
   determining, by the processing system for each passenger of the plurality of passengers, a portion of the additional cost weighted in accordance with a portion of the time savings benefit received by each passenger of the plurality of passengers.

2. The method of claim 1, further comprising:
   sending, by the processing system, a message to a navigation application to alter a navigation route of the vehicle to the selected route.

3. The method of claim 2, wherein the selected route corresponds to a cost threshold and a time threshold.

4. The method of claim 1, wherein the vehicle is at least a level three autonomous vehicle.

5. The method of claim 1, wherein the express lane pass information comprises a preference of how a toll is divided among the plurality of passengers.

6. The method of claim 1, wherein the selection is based on the profile for at least one of the plurality of passengers.

7. The method of claim 1, wherein the profile comprises a daily amount that is used for express lanes.

8. An apparatus comprising:
   a processor; and
   a memory coupled with the processor, the memory storing executable instructions that when executed by the processor cause the processor to effectuate operations comprising:
   receiving ride sharing requests from equipment of a plurality of prospective passengers;
   obtaining a profile for each of the plurality of prospective passengers, the profile including a predetermined preference regarding sharing costs associated with a shared ride;
   accepting ride sharing requests from a set of the equipment of the plurality of prospective passengers, resulting in a shared ride with a plurality of passengers traveling in a vehicle, the accepting based on the predetermined preference of each of the plurality of passengers;
   sending a plurality of destination locations each associated with a passenger of the plurality of passengers;
   responsive to sending the plurality of destination locations, receiving a plurality of routes and corresponding financial costs for using each route of the plurality of routes, wherein each route of the plurality of routes comprises express lanes;
   displaying the plurality of routes and corresponding costs for using each route of the plurality of routes;
   receiving a selection of a route of the plurality of routes;
   transmitting an indication of the selection to an interface of a driver of the vehicle;
   determining an additional cost and a time savings benefit associated with the selected route; and
   determining, for each of the plurality of passengers in the vehicle traveling on the selected route, a portion of the additional cost weighted in accordance with the time savings benefit received by each passenger of the plurality of passengers.

9. The apparatus of claim 8, wherein the plurality of routes is determined based on toll information.

10. The apparatus of claim 8, wherein the plurality of routes is determined based on express lane pass information associated with a profile of a user of the apparatus, wherein the apparatus is a mobile device.

11. The apparatus of claim 8, wherein the plurality of routes is determined based on traffic information.

12. The apparatus of claim 8, the operations further comprising:
   displaying the selected route.

13. The apparatus of claim 8, wherein the selected route corresponds to a cost threshold and a time threshold.

14. The apparatus of claim 8, wherein the apparatus is at least a level three autonomous vehicle.

15. The apparatus of claim 8, wherein the plurality of routes is determined based on express lane pass information associated with a profile of at least one of the plurality of passengers.

16. The apparatus of claim 15, wherein the profile comprises a daily amount that may be used for express lanes.

17. An apparatus comprising:
   a processing system including a processor; and
   a memory coupled with the processor, the memory storing executable instructions that when executed by the processing system facilitate performance of operations comprising:
   receiving ride sharing requests from equipment of a plurality of prospective passengers;
   obtaining a profile for each of the plurality of prospective passengers, the profile including a predetermined preference regarding sharing costs associated with a shared ride;
   accepting ride sharing requests from a set of the equipment of the plurality of prospective passengers, resulting in a shared ride with a plurality of passengers traveling in a vehicle, the accepting based on the predetermined preference of each of the plurality of passengers;
   receiving traffic information, wherein the traffic information comprises traffic conditions along one or more routes;
   receiving express lane pass information associated with a profile for each of a plurality of passengers traveling in a vehicle, each of the plurality of passengers having a destination of a plurality of destinations;
   receiving toll information along the one or more routes;
   based on the traffic information, express lane pass information, or toll information, determining a plurality of routes to the plurality of destinations respectively and corresponding costs for using each route of the plurality of routes;
   transmitting the plurality of routes and corresponding costs for using each route of the plurality of routes;
   receiving a selection of a route of the plurality of routes;
   transmitting an indication of the selection to an interface of a driver of the vehicle;
   determining an additional cost and a time savings benefit associated with the selected route; and
   determining, for each passenger of the plurality of passengers, a portion of the additional cost weighted in accordance with a portion of the time savings benefit received by each passenger of the plurality of passengers.

18. The apparatus of claim 17, the operations further comprising:
   sending a message to a navigation application to alter a navigation route of the vehicle to the selected route.

19. The apparatus of claim 17, wherein the express lane pass information comprises a preference of how a toll is divided among the plurality of passengers.

20. The apparatus of claim 17, wherein the profile for at least one of the plurality of passengers comprises a daily amount that is used for express lanes.

* * * * *